US012763576B2

(12) United States Patent
Wang et al.

(10) Patent No.: US 12,763,576 B2
(45) Date of Patent: Oct. 13, 2026

(54) POWER DISTRIBUTION SYSTEM RECONFIGURATIONS FOR MULTIPLE CONTINGENCIES

(71) Applicant: Siemens Corporation, Washington, DC (US)

(72) Inventors: Yubo Wang, Princeton, NJ (US); Siddharth Bhela, Kendall Park, NJ (US); Ulrich Muenz, Princeton, NJ (US)

(73) Assignee: Siemens Corporation, Washington, DC (US)

( * ) Notice: Subject to any disclaimer, the term of this patent is extended or adjusted under 35 U.S.C. 154(b) by 692 days.

(21) Appl. No.: 18/245,017

(22) PCT Filed: Aug. 30, 2021

(86) PCT No.: PCT/US2021/048132
§ 371 (c)(1),
(2) Date: Mar. 13, 2023

(87) PCT Pub. No.: WO2022/055731
PCT Pub. Date: Mar. 17, 2022

(65) Prior Publication Data

US 2023/0361565 A1 Nov. 9, 2023

Related U.S. Application Data

(60) Provisional application No. 63/125,429, filed on Dec. 15, 2020, provisional application No. 63/077,827, filed on Sep. 14, 2020.

(51) Int. Cl.
*H02J 3/0073* (2026.01)
*H02J 3/388* (2026.01)
*H02J 103/35* (2026.01)

(52) U.S. Cl.
CPC ............ *H02J 3/0073* (2020.01); *H02J 3/388* (2020.01); *H02J 2103/35* (2026.01)

(58) Field of Classification Search
CPC ...... H02J 3/0073; H02J 3/388; H02J 2203/10; H02J 2203/20; G06N 5/01; G06N 7/01;
(Continued)

(56) References Cited

U.S. PATENT DOCUMENTS

2013/0185039 A1 7/2013 Tesauro et al.
2013/0346057 A1* 12/2013 Lin .......................... H02J 3/00 703/18

(Continued)

*Primary Examiner* — Zhipeng Wang

(57) ABSTRACT

System and method simulate power distribution system reconfigurations for multiple contingencies. Decision tree model is instantiated as a graph with nodes and edges corresponding to simulated outage states of one or more buses in the power distribution system and simulated states of reconfigurable switches in the power distribution system, Edges related to each outage are disconnected. A reconfiguration path is determined with a plurality of switches reconfigured to a closed state by an iteration of tree search algorithms. A simulation estimates feeder cable and transformer loading and bus voltages on the reconfigured path for comparing against constraints including system capacity ratings and minimum voltage. Further iterations identify additional candidate reconfiguration paths which can be ranked by total load restoration.

13 Claims, 10 Drawing Sheets

(58) Field of Classification Search
CPC .......... Y02E 60/00; Y04S 10/52; Y04S 40/20; G06Q 10/06315; G06Q 50/06
See application file for complete search history.

(56) References Cited

U.S. PATENT DOCUMENTS

| | | | | |
|---|---|---|---|---|
| 2017/0358914 | A1* | 12/2017 | Chaiquin .......... | H02J 13/00036 |
| 2018/0316188 | A1* | 11/2018 | Ishchenko ............. | H02J 3/0012 |
| 2020/0127457 | A1* | 4/2020 | Liu ...................... | G06N 3/0455 |
| 2020/0153273 | A1* | 5/2020 | Sun ....................... | H02J 3/0012 |

* cited by examiner

| | 0 | 1 | 2 | 3 |
|---|---|---|---|---|
| in stack time | 1 | 2 | 3 | 6 |
| out stack time | 8 | 5 | 4 | 7 |

POWER DISTRIBUTION SYSTEM RECONFIGURATIONS FOR MULTIPLE CONTINGENCIES

STATEMENT REGARDING FEDERALLY SPONSORED DEVELOPMENT

Development for this invention was supported in part by Subaward Agreement No. DE-EE0008769 awarded by Department of Energy (US-DOE). The United States Government has certain rights in this invention.

TECHNICAL FIELD

This application relates to power distribution systems. More particularly, this application relates to power distribution system reconfigurations for multiple outage contingencies.

BACKGROUND

In large scale power distribution systems, robustness is designed into the systems by inclusion of redundant feeder paths for every load. Switches are strategically positioned in the network allowing power to follow different paths to each load. The switches are either normally open or normally closed. Contingency planning for line outages (e.g., due to severe weather or wildfires) involves performing contingency studies for determining best case switching decisions for reconfiguring radial feeder paths to bypass the fault for restoration of power to system loads, ideally to as many of the interrupted buses as possible. Critical loads (e.g., hospitals, emergency responders, etc.) are a priority and minimizing restoration time is an important objective. Fast response to line outages requires taking critical control actions in a proper sequence for system risk mitigation. Finding alternate paths for the power supply is complex as there can be thousands of buses and hundreds of switches throughout the network. Switching often requires dispatching a work crew to manually operate the switches, and the proper sequence for multiple switch operations is critical.

In industry, it is common practice to perform N-1 contingency studies, where N-1 represents N buses in the distribution systems less 1 bus due to a single component failure (i.e., study the power system performance under various scenarios having a single component failure, such as one line outage). Another contingency study type is N-1-1, in which there is a single loss followed by another single loss. During the planning stage, power system engineers run exhaustive N-1 cases to ensure the power system is robust under any single line failure/outage. A more comprehensive contingency study attempts to model more severe distribution system failures for scenarios with multiple outages (i.e., k failures). However, N-k contingency studies are not typically explored in industry as the number of possible contingencies even for a small value of k make total enumeration computationally intractable. Tractable approaches instead rely on determining service restoration strategies once a set of k line outages have been identified (post-outage).

N-k contingency studies have been explored in academia by researchers with focus on two approaches for a solution. A first approach formulates the problem into an optimization problem and solves with standard optimization solvers. Advantages of this approach are that continuous control variables are modeled, and it is capable of multistep decision making. However, the limitation of this approach is that is only applicable to small distribution systems, unscalable to larger systems due to presence of integer variables. A second approach formulates the problem into a graph reduction problem and then uses graph search (e.g., Minimum Spanning Tree) for a solution using a single-step decision process. While this approach solves large-scale problems, it cannot model continuous control variables, nor can it perform multistep decision making.

Another shortcoming of prior works is the attempt to model contingencies using deterministic outages, such as with distribution system software tools (e.g., open source software OpenDSS). Depending on the whether there is a dedicated function for N-k deterministic distribution system resiliency study, the deterministic N-k resiliency can be performed by stacking multiple N-1 studies. However, line outages are not deterministic as power lines in certain areas (for example in the snowy area routed across the mountain) are subject to more vulnerability in other areas. Moreover, natural disasters generate outages that are inherently stochastic. Hence, proper response contingencies require stochastic analysis.

SUMMARY

System and method are provided for power distribution system reconfiguration simulations for multiple contingencies. In one aspect, a greedy topology reconfiguration algorithm models a distribution system and simulates single (N-1), sequential (N-1-1), or simultaneous (N-k) contingency scenarios. The topology reconfiguration algorithm seeks to determine which set of switches to operate in a distribution system to serve maximum load while adhering to network and operational constraints such as radial structure, line and transformer loading limits, and bus voltages. The contingency analyses are useable for either pre-outage planning or post-outage recovery.

In an aspect, a computer system is provided system for power distribution system reconfigurations for multiple contingencies. A memory stores algorithmic modules executable by a processor, the modules including a decision tree engine and a power flow simulation engine. Decision tree engine instantiates a decision tree model configured as a graph with nodes and edges corresponding to simulated outage states of one or more buses in the power distribution system and simulated states of reconfigurable switches in the power distribution system. The model spans from parent nodes to child nodes in a radial pattern of branches. Decision tree engine disconnects edges in the model related to each outage and determines a reconfiguration path with a plurality of switches reconfigured to a closed state by iteration of tree search algorithms. Power flow simulation engine generates a simulation to estimate feeder cable and transformer loading and bus voltages on the reconfigured original graph in response to a simulation trigger, compares the estimates against constraints including system capacity ratings and minimum voltage, the constraints extracted from a power distribution system database, and classifies the reconfiguration as successful on a condition that the constraints are satisfied. Iterations of tree search algorithms are repeated to identify additional candidate reconfiguration paths and to rank reconfiguration paths classified as successful.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Systems and methods are disclosed for enhancing resilience of a large-scale power distribution system by optimizing total load service restoration in the context of N-k contingency analysis. Power distribution systems consisting of feeder buses, feeder lines (herein, "lines" relate to feeder cables from buses) and transformers, follow a radial tree pattern to distribute power in one direction from feeder head buses in a downstream direction to load buses, which maintains protective safeguards. As part of a N-k contingency analysis for hypothetical k failures, a decision tree model engine generates a model that can identify all feasible restoration paths. As an example of a practical application, a distribution system may have N>=10,000 buses and k<=4 outages. An objective is to find top candidate restoration paths that restore the greatest load to the system including prioritized critical loads. Another objective is to determine the optimum operation sequence of configurable switches. The benefit arising from this point is a more resilient operation in distribution systems. On one hand, contingencies, such as severe weather events or natural disasters, often hit distribution systems sequentially. On the other hand, typical distribution systems consist of many manual breakers that are costly to operate, as utilities have to dispatch field technicians to open/close them. As a result, if decisions are made poorly, it is possible that a first decision to close an originally opened switch is followed by a second decision to open the same switch.

In addition, a stochastic feature is incorporated into the contingency analysis which is useful for pre-outage planning and post-outage recovery. By considering the probabilities of adversary contingencies, a system operator is able to best account for the scenarios that have higher averaged damage. Natural disasters are usually stochastic. Some line outages are likely to happen, but have regional impacts, other line outages are unlikely to happen, however, can introduce cascading failures. Deterministic N-k planning tends to ignore contingencies with small probability but large consequences. The embodiments of this disclosure find a balance between large probability/small damage and small probability/large damage events, thereby helping distribution system operators to avoid black swan events in power distribution systems.

Figure 1:
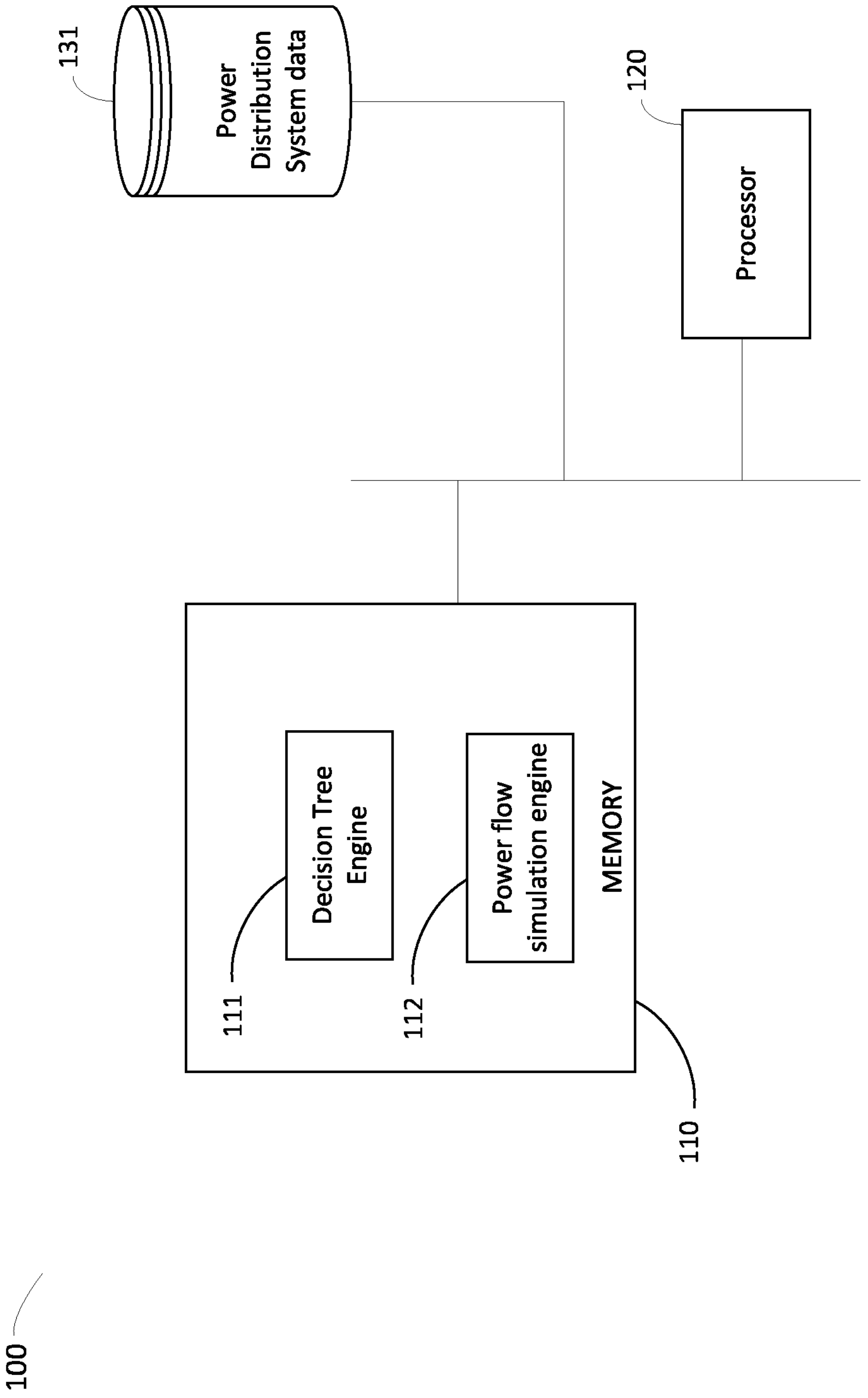
FIG. 1 shows an example of a computer-based system for performing an N-k contingency analysis in accordance with embodiments of this disclosure.

FIG. 1 shows an example of a computer-based system for performing an N-k contingency analysis in accordance with embodiments of this disclosure. A system 100 includes a processor 120 and memory 110 having stored software modules with instructions executable by processor 120. A decision tree model engine 111 is configured to construct decision tree models that span from parent nodes to child nodes in a radial pattern as a contingency restoration path is explored during a model simulation. A power flow simulation engine 112 is configured to simulate bus voltages, transformer loading, and feeder line loading for comparison against design constraints to assess whether or not a contingency restoration path is successful. Power distribution system data 131 is stored in a remote database, accessible by a network connection.

Figure 2:
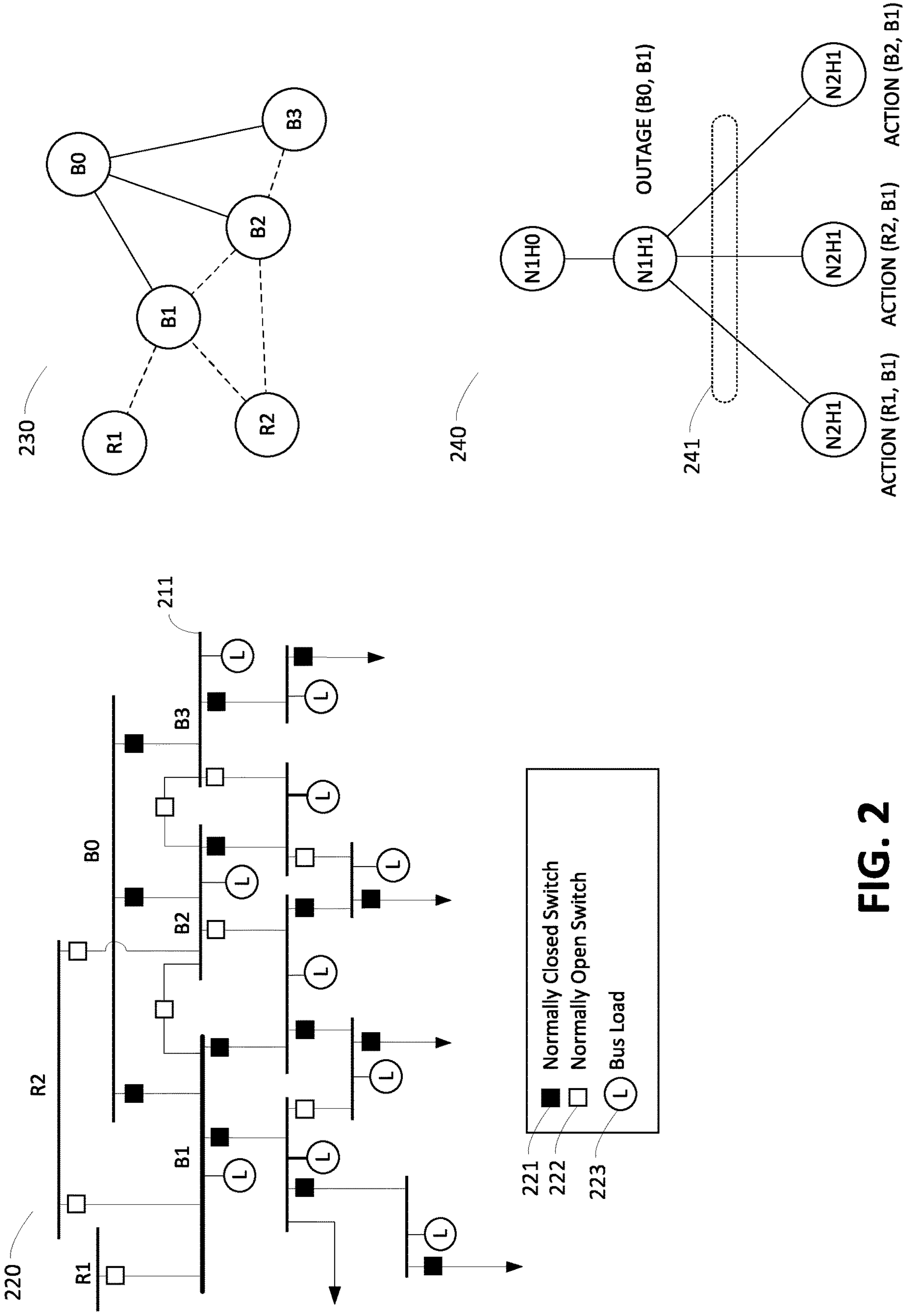
FIG. 2 shows an example of power distribution system data in accordance with embodiments of this disclosure.

FIG. 2 shows an example of power distribution system data in accordance with embodiments of this disclosure. In an embodiment, decision tree engine 111 receives power distribution system data 131 as input, shown in FIG. 2 in the form of a system diagram 200 (e.g., as supplied by a utility company) having a radial network of feeder buses 211, feeder cables, transformers (not shown), and bus loads 201. As shown, system diagram 200 represents a section of the entire distribution system, simplified for illustrative purpose. An actual power distribution system could comprise 1000 buses or more. Each bus 211 has one or more feeders that can provide primary or secondary power supply depending on the state of a normally closed switch 221 or normally open switch 222 as arranged in a distributed manner for improved stability of the system through redundancy. The power distribution data 131 may be extracted by decision tree engine 111 from charts or diagrams such as system diagram 200 and stored as a database. In an aspect, power distribution system data 131 includes the switch state information, load information, parent-child relationships of buses 211, feeder cable capacity ratings, and transformer capacity ratings.

In an embodiment, decision tree engine 111 generates a circuit graph based on the power distribution system data 131. As shown, circuit graph 230 illustrates such a circuit graph that represents a portion of distribution system 220 for top level buses B0, B1, B2, B3, R1 and R2. Normally open switches are represented by dashed edges, and normally closed switches are represented by solid edges. In an embodiment, decision tree engine 111 generates a decision tree based on the power distribution system data 131. The decision tree may be generated directly from the power distribution system data 131 or based on the intermediate data using circuit graph 230. An example of a decision tree section is illustrated by decision tree 240, in which each node represents a state of the system. In this example, node N1H0 represents the initial state of the system, such as a normal state. Upon a first simulated outage between buses B0 and B1, an outage decision tree node N1H1 is generated representing the outage event, from which three possible decision tree paths span out to three action decision tree nodes N2H1. For example, a first action tree node may represent a decision, in response to an outage to edge (B0, B1), to close normally open switch of edge (R1, B1). Similarly, action decision tree nodes can be generated for decisions to close normally open switches of edges (R2, B1) or (B2, B1).

The outage simulation by decision tree engine 111 generates decision tree nodes that track information related to a respective decision for the node, which may include one or more of the following: switch and line status, actions related to an edge, reward and penalty values to promote or discourage a decision path, and sequence of k outages. Switch and line status represents an open line due to a lost bus from an outage (i.e., an edge outage in the circuit graph). Action information can include the action of an open edge representing an outage, or a manual action due to a reconfigured switch in response to an outage. Reward values are computed as a bus load that would be restored by a switch reconfiguration (e.g., closing a normally open switch) for the current decision path. An objective for restoration is maximizing lost load restoration. Penalty values are computed by weighting according to depth of the circuit graph tree being reconnected, which accounts for anticipated voltage drop being proportional to circuit length. Penalty values can satisfy an objective to maintain bus voltage to be greater than the minimum allowable threshold as defined for stable power delivery (e.g., system transformers having minimum input voltage requirements to meet delivery of standard output voltage to consumers). Outage sequence information may be tracked by the decision tree for a simulation so that different contingencies can be compared. For example, to simulate N-k for k=3 outages for circuit graph 230, different sequences may be simulated and the results can be evaluated for resiliency across the different contingencies. To continue the simulation in FIG. 2, a second outage may be simulated for edge (B0, B2), and the decision tree 240 can be redrawn by decision tree 111 to reflect this additional loss. As a result, the decision path for action (B2, B2) is no longer available, and the exploration of contingencies through decision tree 240 is modified accordingly. A third outage in the sequence could be selected for edge (B0, B3) and the decision tree would be redrawn again. For a different sequence scenario, the first, second and third outages would be reordered to evaluate the results of the decision tree exploration in a likewise manner. In an embodiment, all three outages may be evaluated in a simulation of a simultaneous outage. When evaluating an actual power distribution system, many more variations of outage sequences may be explored as the size of the circuit graph 230 is greatly expanded to represent all buses and switching possibilities. Higher level N-k contingencies may also be explored, such as for k>3.

Figure 3:
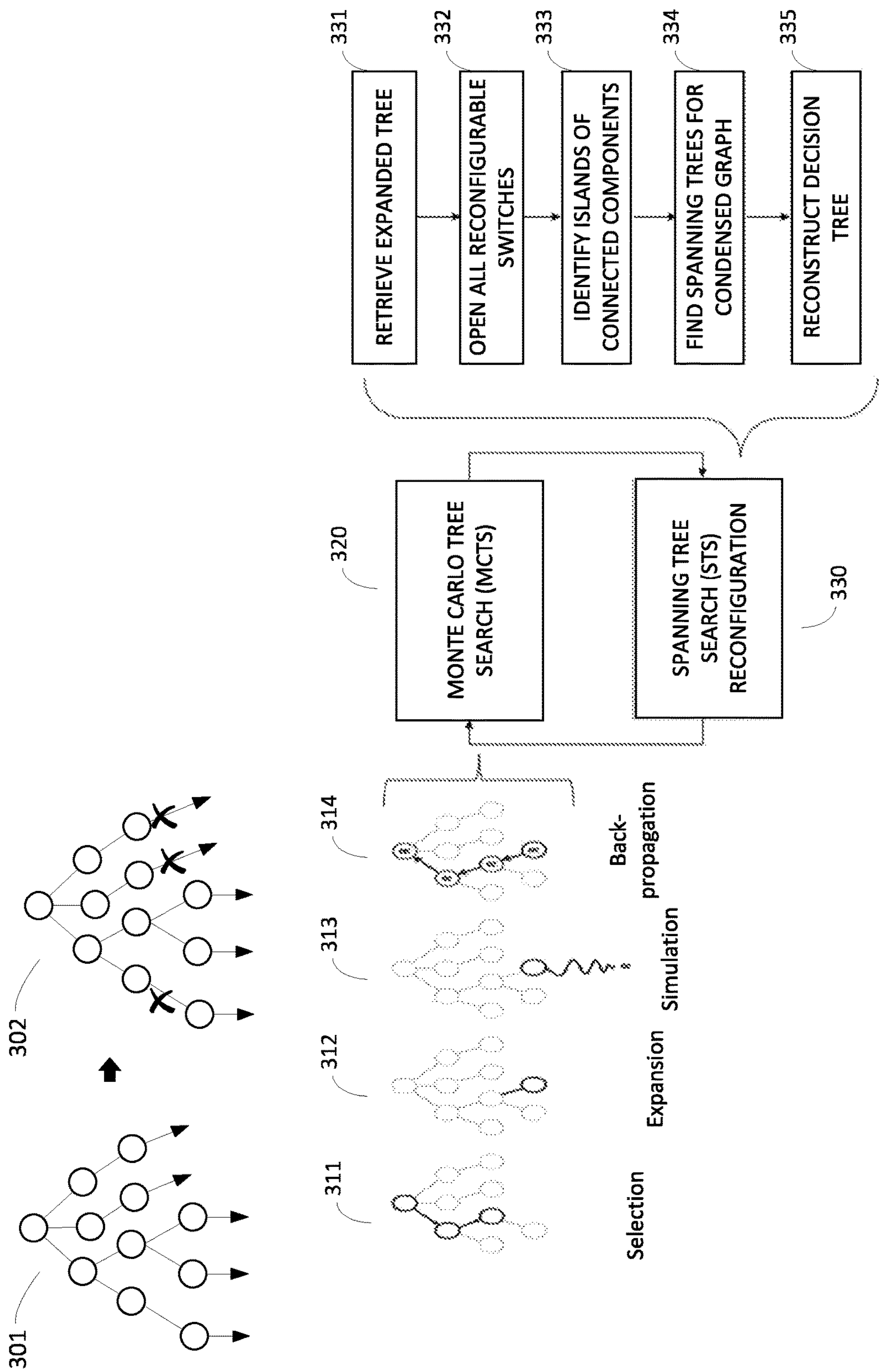
FIG. 3 shows and example of decision tree modeling in accordance with embodiments of this disclosure.

FIG. 3 shows and example of decision tree modeling in accordance with embodiments of this disclosure. In an embodiment, decision tree engine 111 commences an N-k contingency study by selecting k bus outages for a first simulation. Decision tree engine 111 instantiates a virtual decision tree 301 based on the power distribution system data 131. Next at 302, k feeders are removed from the graph, to simulate a multiple failure scenario (N-k) for contingency analysis. As described above for FIG. 2, the sequence may be analyzed as individual outages simulated to occur as a series of outages in rather than simultaneously. To perform exploration for restoration candidate paths, decision tree engine 111 performs a Monte Carlo tree search (MCTS) 320 combined with a spanning tree search (STS) algorithm 330.

For sequential decision making (i.e., N-k contingencies), the MCTS engine uses a MCTS algorithm for finding out the optimal operation sequence of configurable switches. For every k, a switch configuration decision at each time is determined. The depth of the decision tree corresponds to the k contingencies. The MCTS algorithm executes an iterative method where every iteration has four steps: selection 111, expansion 112, simulation 113, and backpropagation 114. In the selection phase 111, the algorithm searches for the best child node according to an Upper Confidence Bound. Once it reaches the best child node, the expansion step 112 expands the decision tree. MCTS algorithm 320 calls STS algorithm 330 at this stage to determine the possible decisions to be made.

For every contingency, STS algorithm 330 seeks out all possible feasible reconfiguration solutions according to the following steps. STS algorithm 330 retrieves expanded decision tree 331 and opens one or more of all configurable switches 332 (e.g., sets open a subset of configurable switches). This step provides a significant improvement over prior art solutions that typically only analyze the distribution system keeping all normally closed switches closed. By opening one or more of all configurable switches for the contingency study, a greater number of possible reconfiguration contingencies are within the pool of candidates. Next, STS algorithm 330 identifies islands of connected components 333, finds spanning trees for a condensed graph 334, and reconstructs the decision tree 335. During step 333, the original graph size is significantly reduced by aggregating the islands of connected components as a single load node on the graph, which will be explained in greater detail below with reference to FIG. 5. The graph reduction step 333 greatly accelerates the contingency analysis without sacrificing strength of predicted solutions.

Following the trees spanning, MCTS algorithm 320 takes the reconstructed graph and executes the simulation step 313 using a decision for operating an open switch to a closed state, which connects a load to the expanded bus in the virtual model. The selection of the switch for closing may be a random decision or may be based on optimizations that will be described in greater detail below with reference to FIG. 9. MCTS algorithm 320 instructs the power flow simulation engine 112 to determine the new loading at each bus for the current reconfiguration attempt, along with the total restored load value as a metric for ranking the candidate reconfiguration contingencies. Based on the new loading values, the simulation engine 112 performs estimations of bus voltages, feeder cable current flow, and transformer loads for assessment with respect to system constraints, such as for feeder capacity (e.g., current (Ampere) overloading), transformer capacity, and minimum bus voltage (e.g., 0.95 rated voltage). If all constraints are satisfied within a defined tolerance, the simulation engine 112 determines the current reconfiguration attempt to be satisfactory under safety and system stability requirements.

After the simulation 313 is finished, the MCTS algorithm 320 executes a backpropagation 114 on the simulation outcome (often called reward) to update the success rate for each node along the path that leads to this decision. For example, each node keeps a ratio score (s/A), where s is the value for successful reconfigurations per A attempts. The MCTS algorithm 320 and STS algorithm 330 operates a number of iterations N as described above. Candidate reconfigurations are ranked according to success rate scores and/or which reconfigurations maximize the reconnected load. For example, the number of iterations may be defined by a minimum value for N based on experimentation.

Alternatively, the iterations may be repeated until a convergence test is satisfied, such as convergence of the ranked candidate list.

Figure 4:
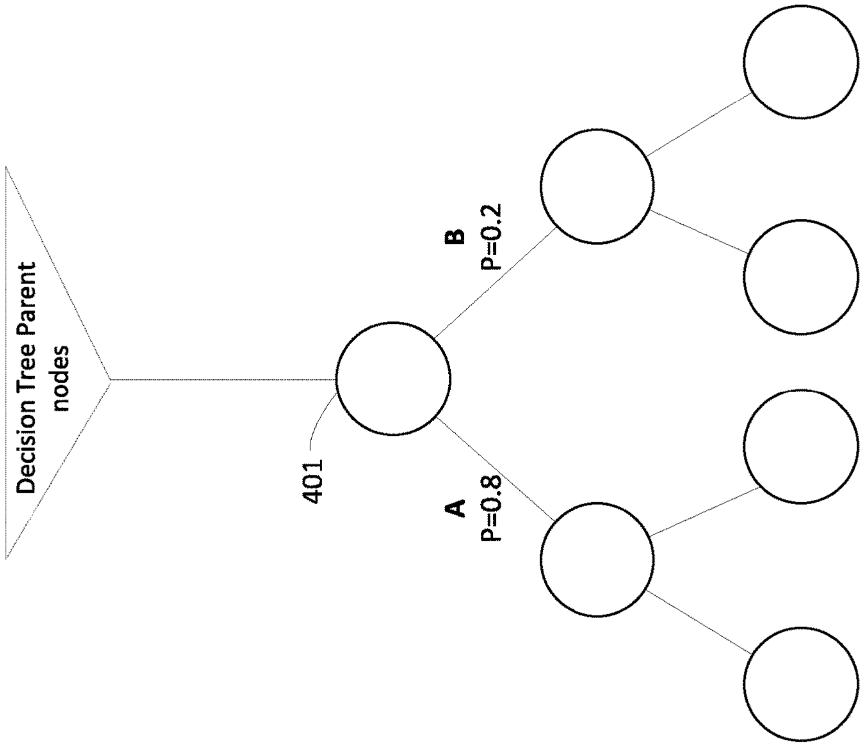
FIG. 4 shows an example of a stochastic adversary contingency feature in accordance with embodiments of this disclosure.

FIG. 4 shows an example of a stochastic adversary contingency feature in accordance with embodiments of this disclosure. In an embodiment, stochastic adversary contingencies, in the form of chance nodes, are built into the decision tree model generated by decision tree engine 111 during simulation step 313. As an example, chance node 401 in FIG. 4 tracks probabilities for reconfiguration branch decision between branch A and branch B. For a particular distribution system state, chance node 401 must either feed child node A or B, corresponding to two possible adversary contingencies. Chance node 401 captures the probabilities for a successful reconfiguration, and therefore grows the decision tree according to the probabilities (in this branch A has a probability p=0.8, and branch B has a probability of p=0.2). In an embodiment, the probabilities are based on trends from previous iterations. In another embodiment, probabilities can capture likelihood of failure derived from historical data for a power distribution system, such as branches most susceptible to outages during particular weather conditions (e.g., heavy snow or ice). This failure probability can be beneficial for restoration efforts when a limited repair crew must be dispatched to various locations for operating reconfigurable switches. The contingency study performed by system 100 using chance nodes 401 is then a useful tool for predicting which portions of the distribution system are most vulnerable and likely to fail next in a series of k failures. The candidate restoration contingencies can indicate which scenarios have higher than average damage. Some predicted line outages have a high likelihood of occurrence, but also have regional impacts. Other predicted line outages are unlikely to happen, however, they can introduce cascading failures. Deterministic N-k planning tends to ignore contingencies with small probability but large consequences. The stochastic embodiment finds a balance between large probability small damage and small probability large damage events, thereby helping distribution system operators to avoid black swan events in distribution systems.

Figure 5:
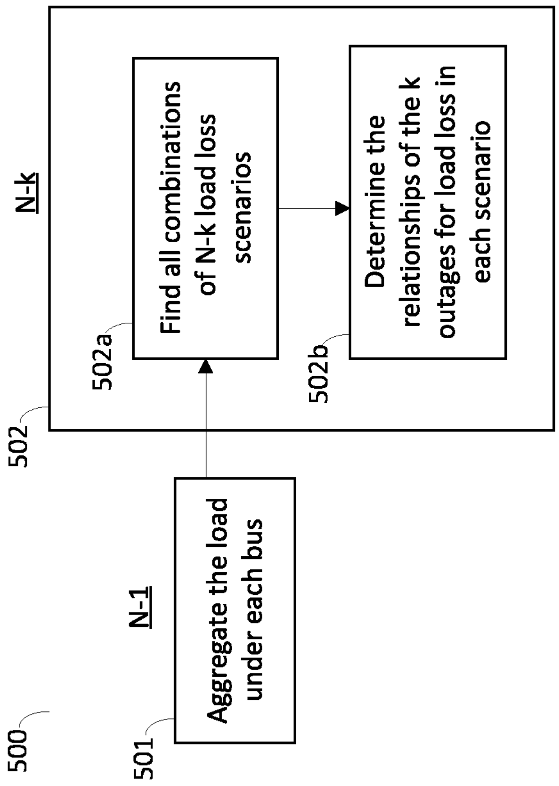
FIG. 5 is a flow chart of an example for an algorithmic component that aggregates load losses as part of a fast stochastic resiliency forecast in accordance with embodiments of this disclosure.

FIG. 5 is a flow chart of an example for an algorithmic component that aggregates load losses as part of a fast stochastic resiliency forecast in accordance with embodiments of this disclosure. In an embodiment, a two-part process 500 is introduced in the tree decision engine partly based on aggregation of load in a radial distribution feeder. This two-part process is performed by power flow simulation engine 112 during the simulation stage 313. Multiple line/transformer outages that are independent and identically distributed (i.i.d) can be defined separately. Then combinations of different i.i.d. outages are used to calculate the joint outage probabilities, depending on whether it is an N-1 contingency or N-k contingency.

| Terms | |
|---|---|
| N | Number of buses in a system |
| k | Number of actual outages in a system |
| M | Number of possible outages in a system |
| $L_i$ | Aggregated load under bus i and its children |
| $l_i$ | Load under bus i |
| $p_i$ | Probability of line/switch element i has an outage |
| K | Set of k lines that have outages |
| G | A directed radial graph, direction pointing from root to leaves |
| V | Set of nodes in a graph |

-continued

| Terms | |
|---|---|
| E | Set of edges in a graph |
| $V_0$ | Substation bus |

In first part 501 of process 500, the decision tree is traversed in a Breadth-first-search (BFS) type of traversal to identify connected components (step 333), and then traverses in a bottom-up manner with an objective of determining the aggregated load under each line, so that if one line is taken out (N-1 contingency), load loss can be immediately retrieved.

The second part 502 of process 500 relates to a calculation of load losses for N-k based on the aggregated load loss result. In subpart 502*a*, power flow simulation engine 112 determines all possible N-k load loss scenarios. Given M lines in the distribution system subject to loss, the number of possible scenarios can be denoted as combination $$\binom{k}{M}$$

In sub-part 502*b*, power flow simulation engine 112 determines the relationships of these k outages for load loss in each scenario. The two-part algorithm 500 is configured to avoid miscalculating a load loss (i.e., an overestimation) that would result from simply summing aggregated loads of two lines on the same branch of a distribution circuit.

To perform the first part 501 of process 500, load aggregation for individual distribution circuits is determined. Without loss of generality, there are a total of N buses in a distribution system. For a distribution system with radial structure, the number of lines/transformers is N. M out of the N lines/transformers have chances of outages and k is the actual number of line outages. The N-k resiliency prediction problem is evaluated using an abstracted directed graph G=(V, E) with direction pointing from root to leaves, where Vis the set of nodes in the system, and E is the set of edges in the system.

An example of a pseudo code for part 501 is presented below in Algorithm 1.

Algorithm 1: N-1 Load aggregation for individual distribution circuits.

```
Input: distribution circuit graph G = (V, E), substation bus V_0,
    load under each bus l_i
Initialize unvisited nodes queue Q=[V_0], visited node queue R=[ ]
while Q is not empty:
  V = the first element of Q; Remove N from Q
  if V has child:
    foreach child in V's children:
      Insert the child into Q at its tail
  Insert I into R at its tail
while R is not empty:
  V = the last element of R; Remove V from R
  L_V = l_V + Σ_(V,v)∈E L_v
```

To calculate the possible load losses under each scenario, Algorithm 1 first defines the aggregated load under each bus. The BFS traversal algorithm calculates the load aggregation. Algorithm 1 performs a BFS of the graph and stores the sequence of bus (node) visits in a queue. Node visits are useful for tracking a level of confidence for a particular contingency path in the decision tree, where higher number of visits represents a higher level of confidence. The queue Q is offloaded from the tail of the queue and adds up the aggregated load L from the feeder end in a bottom-up manner. As a result, Algorithm 1 executes an N-1 resiliency level prediction problem to determine the overall load loss after an outage. For this analysis, outage failures are defined by M different lines/transformers that could fail under natural disaster. The probability of outage under line/transformer i is denoted $p_i$, and the probability of outage under line/transformer j is denoted $p_j$, in which it is assumed $p_i$ and $p_j$ are i.i.d if i≠j. N-1 contingency considers the event that only one of M possible outages happens, and each event is denoted as a scenario. With the definition of M possible outages, the algorithm determines the load loss under each scenario and calculates the joint probability of only one of the M possible outages happening. Given the aggregated load calculated using Algorithm 1, the power simulation engine determines the probability associated with each of the N-1 scenarios, which can be expressed as follows:

$$\rho_i = p_i \prod_{j \neq i} (1 - p_j) \qquad \text{Eq. (1)}$$

where $p_i$ is the probability of line/switch element i has an outage.

The second part 502 of process 500 determines N-k resiliency level prediction for contingency reconfiguration paths based on a variable of Depth-first-search (DFS) traversal which traverses a graph in a depthward motion and uses a stack for recall to get the next vertex to start a search, when a dead end occurs in any iteration. The probability that associates with each N-k scenario can be calculated as follows:

$$\rho_K = \prod_{i \in K} p_i \prod_{j \notin K} (1 - p_j) \qquad \text{Eq. (2)}$$

where K is the set of k lines that have outages.

Figure 6:
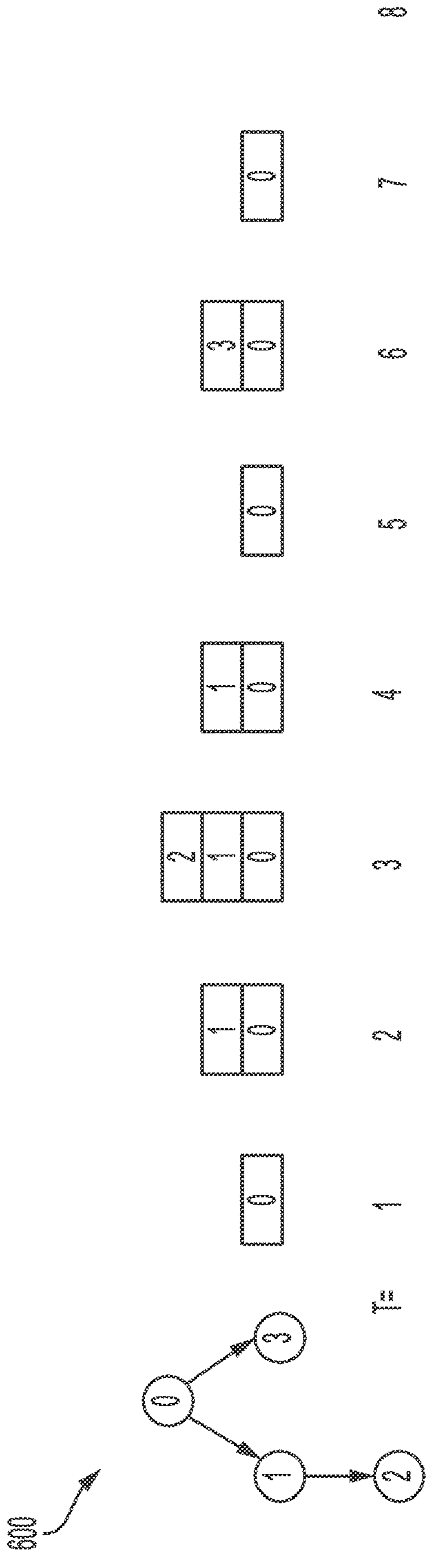
FIG. 6 illustrates an example scenario for N-k contingency considerations in accordance with embodiments of this disclosure.

When it comes to determining the load loss for each distribution circuit lost under k outages where k≥2, the situation is more complicated than the N-1 case. FIG. 6 illustrates an example scenario for N-k contingency considerations in accordance with embodiments of this disclosure. In this example, a small network is represented by a graph 600 having four nodes, each having loads. The loads can be aggregated using the load aggregation according to Algorithm 1. The aggregated load under node 0 contains the load for node 0, 1, 2 and 3. Similarly, aggregated load under node 1 has the aggregated load of node 1 and 2. Thus, if two graph edges (i.e., relationship lines between graph nodes) have outages, the load losses depend on the parent-child relationships of the lost nodes. For example, if an outage results in loss of edges (0,1) and (0,3), the total loss of loads is the sum L(1) of aggregated loads under node 1 and aggregated loads L(3) under node 3. Alternatively, if an outage results in losses of edges (0,1) and (1,2), the overall load loss is only aggregated load L(1) under node 1. Thus, the parent and child relationships among the k lost edges need to be determined.

DFS is performed to determine the parent-child relationship among the outage edges. Given two nodes u and v, DFS is performed from the substation bus. Referring to FIG. 6, the time stamp value intime( ) for when a node is pushed into the stack and the time stamp value outtime( ) that a node is popped out of the stack is recorded. The relationship can be determined by applying the following rule:

If intime(u)<intime(v) and outtime(u)>outtime(v)→u is the parent of v

Else if intime(u)>intime(v) and outtime(u)<outtime(v) →v is the parent of u

Otherwise, u and v are not on the same branch

For example, where node u corresponds to node 0 and node v corresponds to node 3, applying the above rule reveals that u is the parent of v. Alternatively, where node u corresponds to node 2 and node v corresponds to node 3, applying the above rule reveals that u and v are not on the same branch.

An example of a pseudo code for part 502 is presented below as Algorithm 2.

Algorithm 2:
N-k Load aggregation for a set of distribution circuits.

```
Input: distribution circuit graph G = (V, E), substation bus V_0,
   Aggregated load under each bus L, possible outage lines M, line outages k
Initialize intime dictionary in={ }, outtime dictionary out={ }, stack S=[ ]
Set time t= 0, put node V_0 onto S, add in stack time of V_0 into in.
Perform Depth-First-Search. Record in stack time and out stack time of each node
   Generate all the (k M) possible scenarios
   foreach scenario:
     calculate the probability of this scenario
     foreach (2 k) pairs of edges v, u:
       If in(u) < in(v) and out(u) > out(v):
         u is the parent of v
       elif in(u) > in(v) and out(u) < out(v):
         v is the parent of u
       else:
         v and u are not on the same branch
     Add the loads on different branches
```

Figure 7:
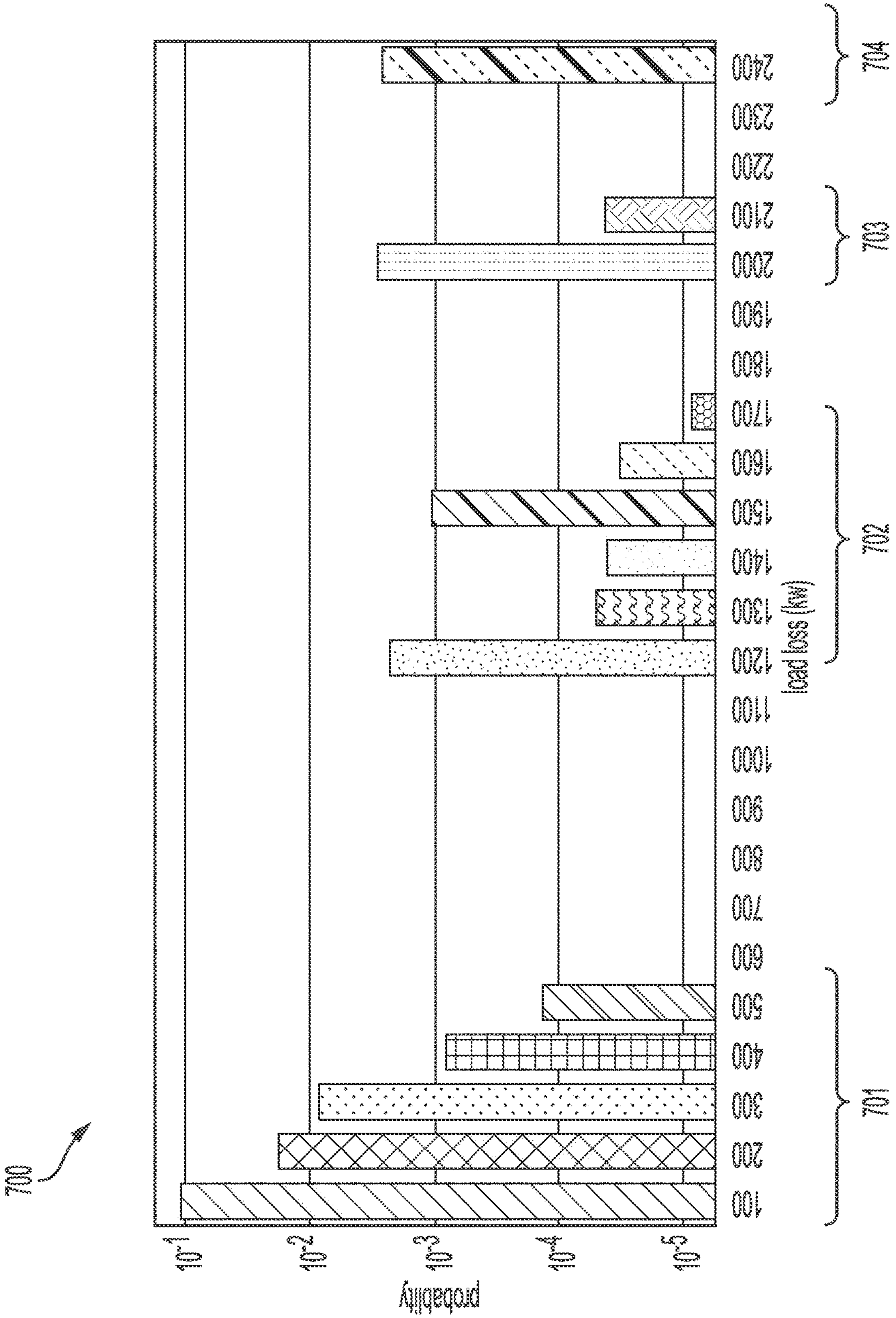
FIG. 7 shows an example of a distribution feeder N-k resiliency overview for multiple candidate reconfigurations in accordance with embodiments of this disclosure.

Advantages of the two-part process 500 with stochastic reconfiguration include the following. Compared with deterministic N-k resiliency, the results provide a system operator a better overview of the system resiliency level for each candidate reconfiguration. In an embodiment, the results of process 500 are sent to a user interface for display presentation to a user. As an example of such a display presentation, FIG. 7 illustrates a stochastic N-k contingency resiliency distribution for multiple candidate reconfigurations in accordance with embodiments of this disclosure. In this example, randomly chosen M=200 possible line/transformer outages (e.g., to mimic uncertainties of a natural disaster or severe weather event) with a uniform distribution between [0, 0.01] are simulated. FIG. 7 shows resiliency level prediction results for an N-2 (i.e., k=2) contingency simulation using tree search process 300 enhanced by stochastic process 500. As shown, the results are binned into 100 kW bins, such that one or more contingencies resulting in 100 kW or less are grouped in this bin. Thus, a distribution of the results is presented, discretized by bins of 100 kW for a simplified snapshot of results. This particular presentation is not limiting, as other bin sizes and ranges may be defined. The probability distributions within each bin are totaled. For example, the first bin indicates that the system has roughly 10% probability for a load loss up to 100 kW. The second bin shows a 2.5% probability for a loss greater than 100 kW and up to 200 kW, and so on for each other bin. From this simulation, the bin distribution 700 falls into clusters as can be seen in FIG. 7 as bin islands 701, 702, 703, 704, each associated with a branch of the distribution system. Within each bin island, the distribution is decaying over power consumption. This is expected as most of the randomly selected line/transformer outages are at the feeder end, which have a higher add-up probability but with smaller loads. Less randomly selected line/transformer outages are at the feeder head, which have a smaller add-up probability but larger aggregated loads. As demonstrated by this example, the N-k resiliency results from the two-part algorithm can provide a power distribution system operator with both the possible load losses and probability for load loss associated with each contingency reconfiguration. This can be a useful power grid operational tool which gives the system operator a better overview of the system resiliency. With this, an operator can take preemptive measures to improve system resiliency. For example, an operator may define resiliency by prioritize mitigating a large load loss with a low probability or may prioritize losing an averaged load (load loss*probability). Depending on preferences, the reward for the tree search algorithms (e.g., MCTS algorithm) can be defined accordingly. In the end, given a defined resiliency preference, process 500 in combination with process 300 determines probability for each contingency reconfiguration and associated load loss, and compares them ranked by preference criteria to select the best candidate reconfiguration.

Figure 8:
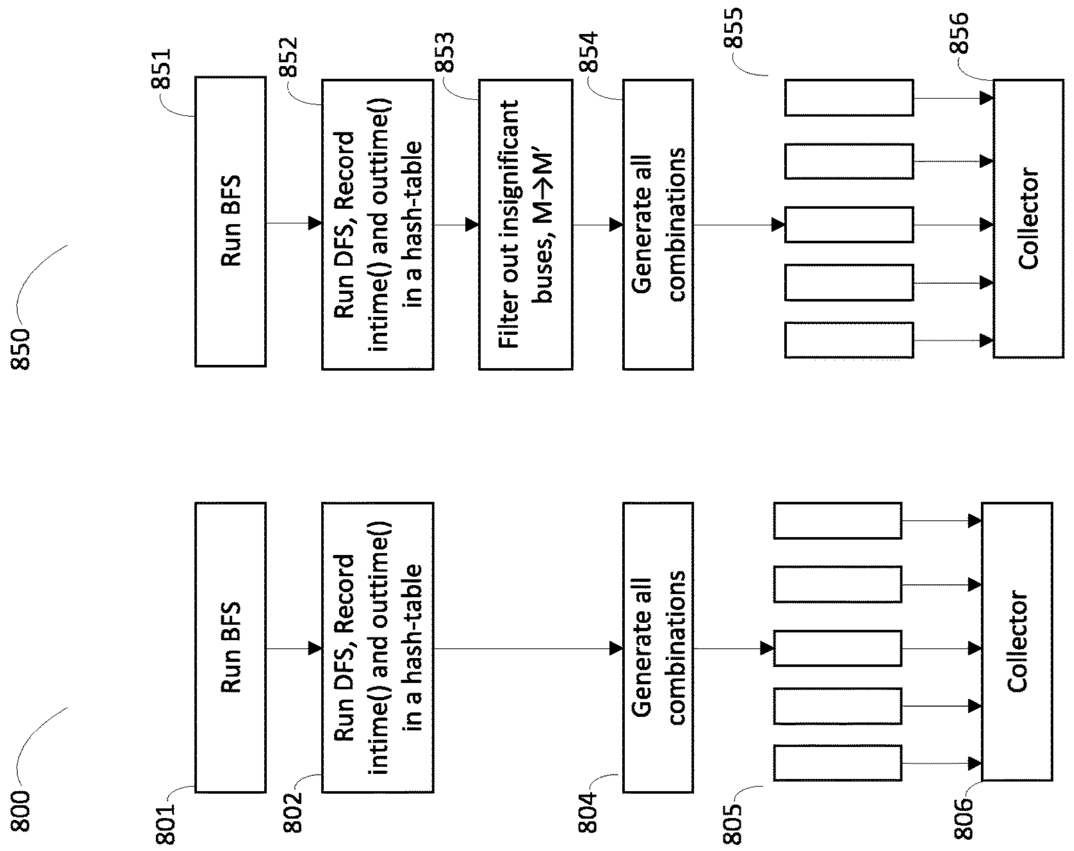
FIG. 8 illustrates examples of parallelization and model reduction features in accordance with embodiments of this disclosure.

For additional enhancements to the resiliency forecasting methods described above, parallelization and model reduction features are introduced in accordance with embodiments of this disclosure, as shown by flow chart examples of FIG. 8. In a first example, process 800 includes running BFS traversal 801 according to Algorithm 1 and running DFS traversal 802 according to Algorithm 2 in which a hash table records the intime( ) and outtime( ) values for outage edges. The next step 804 generates all the $$\binom{k}{M}$$

possible scenario combinations. Because the different scenarios are mutually independent, the probability computation for each scenario (lines 6-7 of Algorithm 2) can be parallelized on different processors (step 805). Additionally, the DFS for parent-child relationship (lines 8-14 of Algorithm 2) can be parallelized on different processors. A collector operation at step 806 tabulates the aggregated loads and probabilities for each scenario.

In another example, process 850 is similar to process 800, where steps 851, 852, 854, 855 and 856 correspond to steps 801, 802 804, 805 and 806. Process 850 introduces model reduction step 853, in which insignificant buses are filtered out. For example, in the original set of M possible line outages, it is possible that some of the outages are either a very low probability or have a very small aggregated load under that line. As a result, step 851 applies empirical thresholds to reduce the number of candidate loss loads from M to M'. Accordingly, the number of combinations generated at 851 can be greatly reduced, which accelerates the resiliency forecast computation.

An advantage of the parallelization and model reduction features described above compared with deterministic approaches is that the results are obtained much faster and are achievable for large power distribution system having 10,000 feeder buses or more. Table 1 summarizes the outperformance in computational time compared with a conventional deterministic approach that uses OpenDSS.

TABLE 1

| Case | OpenDSS | Parallelization | Model Reduction |
|---|---|---|---|
| Time (s) | 99 days | 2 s | 396 ms |
| Speedup | — | 4 m x | 20 m x |

The model reduction component is made possible by the combination of BFS and DFS algorithms used in the proposed stochastic N-k resiliency. The BFS and DFS are all O(Vertex+Edge), so it can be scaled to very large-scale distribution systems.

Figure 9:
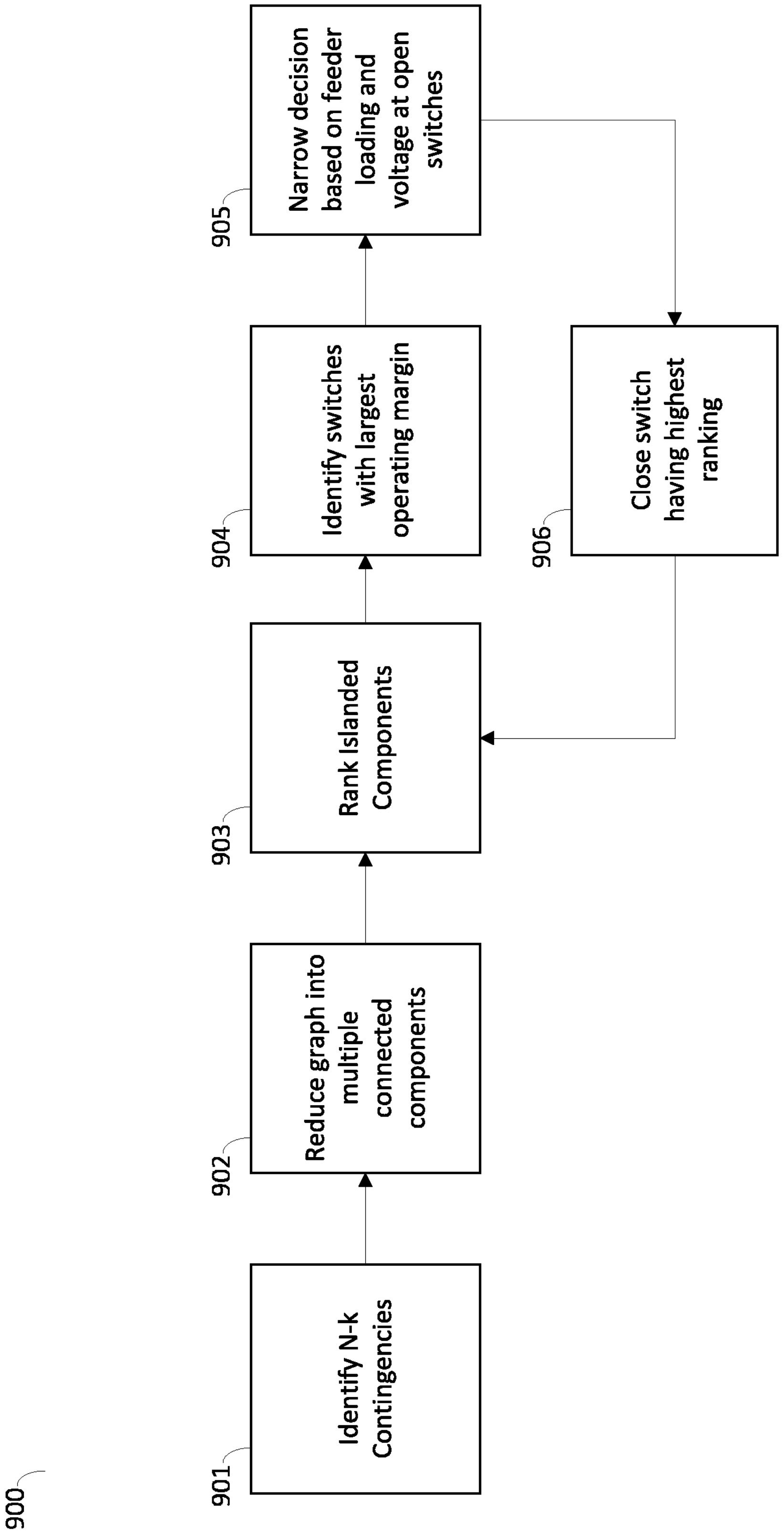
FIG. 9 illustrates a flow chart for an example of a rule-based process for reconfiguration of a power distribution system for identified outages in accordance with embodiments of this disclosure.

FIG. 9 illustrates a flow chart for an example of a rule-based process for reconfiguration of a power distribution system for identified outages in accordance with embodiments of this disclosure. An objective for the decision tree engine 111 in algorithm 900 is to seek the best candidate paths for reconfiguration given an outage condition, applying filtering criteria that favors distribution branches having ample operating margin and branches that feed critical loads and/or largest number of consumers. For scenarios in which k outages have been identified (step 901), such as in the event of a severe weather event for a large power distribution network (e.g., roughly thousands of buses), a N-k contingency study can be performed by decision tree engine 111 to model the network as a decision tree, such as model 301 in FIG. 3. Next, the decision tree engine 111 identifies which nodes are outage nodes based on the input of known outages, and the model is reduced into multiple connected components (step 902), such as model 302 in FIG. 3, in which some nodes are grid-connected and the rest are islanded. In step 903, the islanded components are ranked by decision tree engine 111 in order of importance criteria. For example, an importance grade may be assigned to components according to categories, such as components that feed essential services (e.g., hospitals) and components that feed largest blocks of consumers. Other criteria may be defined as necessary for importance ranking. Next, the open switches (that connect islands to the grid) are evaluated. Decision tree engine 111 identifies switches with the largest operating margin (based on feeder cable and transformer capacity ratings) and down-selects these branches (step 904). Further filtering on the highest ranking components is performed based on other factors, such as loading of the grid connected feeder on the energized side of the switch (i.e., corresponding to number of consumers) and the nodal voltage being above minimum specifications, are also taken into consideration (step 905). Decision tree engine 111 selects a switch with highest rank as the best solution and closes the switch in the virtual model (step 906). For sequential decision making, the algorithm proceeds by re-ranking the loads and proceeding with the previous steps until there are no more islands in the network. Stochastic versions of the N-k formulation where the outages are probabilistic can be handled by using a probability of load loss index to rank the islands.

Figure 10:
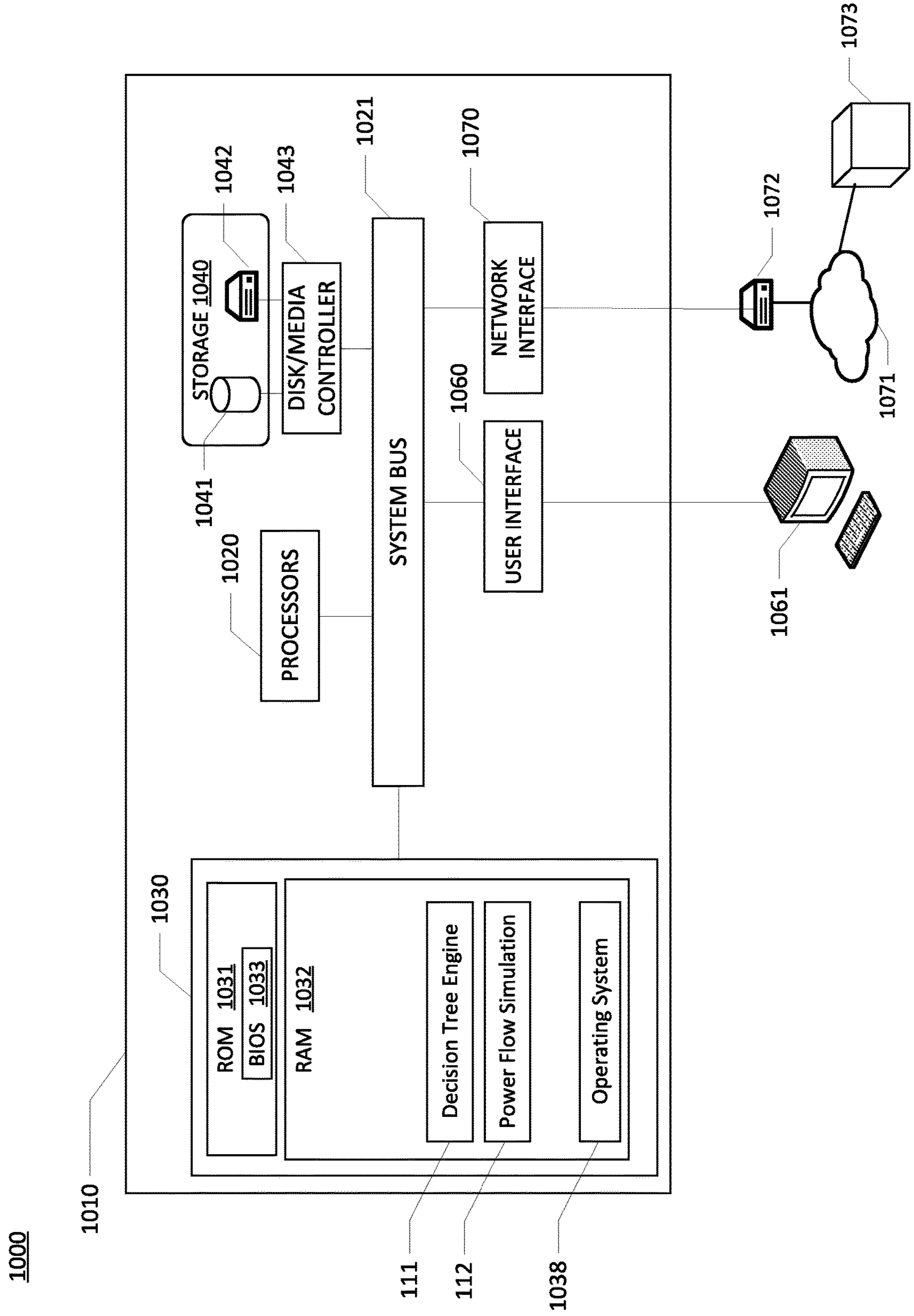
FIG. 10 illustrates an example of a computing environment within which embodiments of the present disclosure may be implemented.

FIG. 10 illustrates an example of a computing environment within which embodiments of the present disclosure may be implemented. A computing environment 1000 includes a computer system 1010 that may include a communication mechanism such as a system bus 1021 or other communication mechanism for communicating information within the computer system 1010. The computer system 1010 further includes one or more processors 1020 coupled with the system bus 1021 for processing the information. In an embodiment, computing environment 1000 corresponds to a system for modeling reconfigurations of a power distribution system in multiple outage contingencies, in which the computer system 1010 relates to a computer described below in greater detail.

The processors 1020 may include one or more central processing units (CPUs), graphical processing units (CPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1020 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 1021 may include at least one of a system bus, a memory bus, an address bus, or a message bus, and may permit exchange of information (e.g., data (including computer-executable code), signaling, etc.) between various components of the computer system 1010. The system bus 1021 may include, without limitation, a memory bus or a memory controller, a peripheral bus, an accelerated graphics port, and so forth. The system bus 1021 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 10, the computer system 1010 may also include a system memory 1030 coupled to the system bus 1021 for storing information and instructions to be executed by processors 1020. The system memory 1030 may include computer readable storage media in the form of volatile and/or nonvolatile memory, such as read only memory (ROM) 1031 and/or random access memory (RAM) 1032. The RAM 1032 may include other dynamic storage device(s) (e.g., dynamic RAM, static RAM, and synchronous DRAM). The ROM 1031 may include other static storage device(s) (e.g., programmable ROM, erasable PROM, and electrically erasable PROM). In addition, the system memory 1030 may be used for storing temporary variables or other intermediate information during the execution of instructions by the processors 1020. A basic input/output system 1033 (BIOS) containing the basic routines that help to transfer information between elements within computer system 1010, such as during start-up, may be stored in the ROM 1031. RAM 1032 may contain data and/or program modules that are immediately accessible to and/or presently being operated on by the processors 1020. System memory 1030 additionally includes modules for executing the described embodiments, such as decision tree engine 111 and power flow simulation engine 112.

The operating system 1038 may be loaded into the memory 1030 and may provide an interface between other application software executing on the computer system 1010 and hardware resources of the computer system 1010. More specifically, the operating system 1038 may include a set of computer-executable instructions for managing hardware resources of the computer system 1010 and for providing common services to other application programs (e.g., managing memory allocation among various application programs). In certain example embodiments, the operating system 1038 may control execution of one or more of the program modules depicted as being stored in the data storage 1040. The operating system 1038 may include any operating system now known or which may be developed in the future including, but not limited to, any server operating system, any mainframe operating system, or any other proprietary or non-proprietary operating system.

The computer system 1010 may also include a disk/media controller 1043 coupled to the system bus 1021 to control one or more storage devices for storing information and instructions, such as a magnetic hard disk 1041 and/or a removable media drive 1042 (e.g., floppy disk drive, compact disc drive, tape drive, flash drive, and/or solid state drive). Storage devices 1040 may be added to the computer system 1010 using an appropriate device interface (e.g., a small computer system interface (SCSI), integrated device electronics (IDE), Universal Serial Bus (USB), or FireWire). Storage devices 1041, 1042 may be external to the computer system 1010.

The computer system 1010 may include a user interface module 1060 for communication with a graphical user interface (GUI) 1061, which may comprise one or more input/output devices, such as a keyboard, touchscreen, tablet and/or a pointing device, for interacting with a computer user and providing information to the processors 1020, and a display screen or monitor. In an aspect, the GUI 1061 relates to a display for presenting resiliency level distributions as earlier described.

The computer system 1010 may perform a portion or all of the processing steps of embodiments of the invention in response to the processors 1020 executing one or more sequences of one or more instructions contained in a memory, such as the system memory 1030. Such instructions may be read into the system memory 1030 from another computer readable medium of storage 1040, such as the magnetic hard disk 1041 or the removable media drive 1042. The magnetic hard disk 1041 and/or removable media drive 1042 may contain one or more data stores and data files used by embodiments of the present disclosure. The data store 1040 may include, but are not limited to, databases (e.g., relational, object-oriented, etc.), file systems, flat files, distributed data stores in which data is stored on more than one node of a computer network, peer-to-peer network data stores, or the like. Data store contents and data files may be encrypted to improve security. The processors 1020 may also be employed in a multi-processing arrangement to execute the one or more sequences of instructions contained in system memory 1030. In alternative embodiments, hard-wired circuitry may be used in place of or in combination with software instructions. Thus, embodiments are not limited to any specific combination of hardware circuitry and software.

As stated above, the computer system 1010 may include at least one computer readable medium or memory for holding instructions programmed according to embodiments of the invention and for containing data structures, tables, records, or other data described herein. The term "computer readable medium" as used herein refers to any medium that participates in providing instructions to the processors 1020 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 1041 or removable media drive 1042. Non-limiting examples of volatile media include dynamic memory, such as system memory 1030. Non-limiting examples of transmission media include coaxial cables, copper wire, and fiber optics, including the wires that make up the system bus 1021. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 1000 may further include the computer system 1010 operating in a networked environment using logical connections to one or more remote computers, such as remote computing device 1073. The network interface 1070 may enable communication, for example, with other remote devices 1073 or systems and/or the storage devices 1041, 1042 via the network 1071. Remote computing device 1073 may be a personal computer (laptop or desktop), a mobile device, a server, a router, a network PC, a peer device or other common network node, and typically includes many or all of the elements described above relative to computer system 1010. When used in a networking environment, computer system 1010 may include modem 1072 for establishing communications over a network 1071, such as the Internet. Modem 1072 may be connected to system bus 1021 via user network interface 1070, or via another appropriate mechanism.

Network 1071 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1010 and other computers (e.g., remote computing device 1073). The network 1071 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1071.

It should be appreciated that the program modules, applications, computer-executable instructions, code, or the like depicted in FIG. 10 as being stored in the system memory 1030 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 1010, the remote device 1073, and/or hosted on other computing device(s) accessible via one or more of the network(s) 1071, may be provided to support functionality provided by the program modules, applications, or computer-executable code depicted in FIG. 10 and/or additional or alternate functionality. Further, functionality may be modularized differently such that processing described as being supported collectively by the collection of program modules depicted in FIG. 10 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 10 may be implemented, at least partially, in hardware and/or firmware across any number of devices.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for simulating power distribution system reconfigurations for multiple contingencies, the computer system comprising:

a processor; and a memory storing program instructions executable by the processor to:

instantiate a decision tree model configured as a graph with nodes and edges corresponding to simulated outage states of one or more buses in the power distribution system and simulated states of reconfigurable switches in the power distribution system, the model spanning from parent nodes to child nodes in a radial pattern of branches;

disconnect edges in the model related to each outage; and determine a reconfiguration path with a plurality of switches reconfigured to a closed state by a Monte Carlo tree search (MCTS) algorithm that executes an iterative method where every iteration has four steps: selection, expansion, simulation, and backpropagation, wherein the MCTS algorithm calls a spanning tree search (STS) algorithm during the expansion to determine possible decisions to be made by setting open a subset of configurable switches in the model, identifying islands of connected components through aggregation of connected loads, and reconstructing a condensed graph from spanning trees across aggregated components;

generate a simulation to estimate feeder cable and transformer loading and bus voltages on the reconfigured path in response to a simulation trigger from the MCTS algorithm with a selection of at least one switch closure;

compare the estimates against constraints including feeder cable capacity ratings, transformer capacity ratings, and minimum bus voltage, the constraints extracted from a power distribution system database; and classify the reconfiguration as successful under safety and system stability requirements when the constraints are satisfied within the defined tolerance; and wherein further iterations of the Monte Carlo tree search (MCTS) algorithm and the spanning tree search (STS) algorithm repeated to identify additional candidate reconfiguration paths and to rank reconfiguration paths classified as successful.

2. The computer system of claim 1, wherein the decision tree tree model includes chance nodes for tracking probabilities for a reconfiguration branch decision of a parent node to either of two child nodes, wherein the probabilities relate to a successful reconfiguration classification.

3. The computer system of claim 2, wherein the processor comprises a set of parallel processors, and the probabilities are computed in a parallelized manner across the parallel processors.

4. The computer system of claim 1, wherein the program instructions further cause the processor to determine an aggregated load under each feeder line by traversing the decision tree using a breadth-first-search traversal algorithm.

5. The computer system of claim 4, wherein the program instructions further cause the processor to determine all combinations of load loss scenarios and parent-child relationships among outage edges, and to calculate a total load loss for all aggregated loads for each distribution circuit lost in the outage.

6. The computer system of claim 5, wherein the parent-child relationships are determined based on recorded intime values for when outage nodes are pushed into a stack and recorded outtime values for when the outage nodes are popped out of the stack during a depth-first-search traversal of the decision tree model.

7. The computer system of claim 1, wherein the program instructions further cause the processor to apply empirical thresholds to reduce the number of candidate loss loads based on outages having low probability or outages having aggregated load below a low threshold.

8. The computer system of claim 1, wherein k outages are known to have occurred, and the program instructions further cause the processor to determine which switch to close by:

reducing the model into multiple connected components including grid-connected components and islanded components;

ranking islanded components in order of importance criteria;

evaluating open switches that connect islanded components to the grid and down-selecting branches with largest operating margin based on feeder cable and transformer capacity ratings;

filtering highest ranking components based on loading of a grid connected feeder on energized side of the switch, and nodal voltage being above minimum specifications; and selecting a switch with highest rank.

9. The computer system of claim 1, wherein the program instructions stored in the memory are configured to cause the processor to perform operations including:

determining probabilities for contingencies based on historical outage data stored in the power distribution system database; sending resiliency level distributions to a display as a graph of contingency probability versus load loss for the contingency; and ranking candidate reconfigurations according to resiliency level based on aggregated load restoration metrics.

10. A computer-implemented method simulating power distribution system reconfigurations for multiple contingencies, the method comprising:

instantiating a decision tree model configured as a graph with nodes and edges corresponding to simulated outage states of one or more buses in the power distribution system and simulated states of reconfigurable switches in the power distribution system, the model spanning from parent nodes to child nodes in a radial pattern of branches;

disconnecting edges in the model related to each outage; and determining a reconfiguration path with a plurality of switches reconfigured to a closed state by a Monte Carlo tree search (MCTS) algorithm that executes an iterative method where every iteration has four steps: selection, expansion, simulation, and backpropagation, wherein the MCTS algorithm calls a spanning tree search (STS) algorithm during the expansion to determine possible decisions to be made by setting open a subset of configurable switches in the model, identifying islands of connected components through aggregation of connected loads, and reconstructing a condensed graph from spanning trees across aggregated components;

generating a simulation to estimate feeder cable and transformer loading and bus voltages on the reconfigured path in response to a simulation trigger from the MCTS algorithm with a selection of at least one switch closure;

comparing the estimates against constraints including feeder cable capacity ratings, transformer capacity ratings, and minimum bus voltage, the constraints extracted from a power distribution system database; and classifying the reconfiguration as successful under safety and system stability requirements when the constraints are satisfied within the defined tolerance;

wherein further iterations of the Monte Carlo tree search (MCTS) algorithm and the spanning tree search (STS) algorithm are repeated to identify additional candidate reconfiguration paths and to rank reconfiguration paths classified as successful.

11. The method of claim 10, further comprising: generating chance nodes in the decision tree model for tracking probabilities for a reconfiguration branch decision of a parent node to either of two child nodes, wherein the probabilities relate to a successful reconfiguration classification, and wherein the probabilities are derived from historical outage data.

12. The method of claim 10, further comprising:

determining an aggregated load under each feeder line by traversing the decision tree using a breadth-first-search traversal algorithm;

determining all combinations of load loss scenarios and parent-child relationships among outage edges; and calculating a total load loss for all aggregated loads for each distribution circuit lost in the outage;

wherein the parent-child relationships are determined based on recorded intime values for when outage nodes are pushed into a stack and recorded outtime values for when the outage nodes are popped out of a the stack during a depth-first-search traversal of the decision tree model.

13. The method of claim 10, wherein k outages are known to have occurred, the method further comprising: determining which switch to close by:

ranking islanded components in order of importance criteria, and filtering highest ranking components based on loading of a grid connected feeder on energized side of the switch, and nodal voltage being above minimum specifications.

* * * * *